3,162,616
ESTERIFICATION PROCESS
Bernard A. Dombrow and Gerald Fesman, Teaneck, N.J., assignors to Nopco Chemical Company, Harrison, N.J., a corporation of New Jersey
No Drawing. Filed June 10, 1959, Ser. No. 819,225
10 Claims. (Cl. 260—75)

The present invention relates to a process for preparing polyesters. More particularly the present invention relates to the preparation of polyesters in an improved manner using a novel class of catalysts.

The preparation of polyesters is well known in the art. These materials are prepared by esterifying polyhydric alcohols with polycarboxylic acids. In many instances it is desired to prepare polyesters having a very low acid number, e.g., less than 5. However, the attainment of a polyester having a low acid number is extremely difficult to achieve. For example, during the last stage of the esterification of the reactants, the reaction proceeds extremely slowly and hence, to reduce the acid value requires very lengthy heating periods and relatively high temperatures. This in many instances tends to bring about formation of a darkened polyester which is unsuitable for further use. Various attempts have been made to reduce the time of the esterification reaction. For instance, British Patent No. 792,011 describes the use of iron, cadmium, cobalt, lead, zinc, antimony and manganese in the form of the metal, its oxide or its salt with a dibasic acid. However, as shown subsequently herein, antimony oxide which is one of the preferred catalysts described in this patent when compared with our catalysts under the same reaction conditions, does not lower the acid value of the polyester in a comparable period of time.

We have unexpectedly discovered that polyesters having an acid number less than 5 and even those having an acid number less than one can be prepared in relatively short periods of time free from discoloration. We have also been able to achieve these low acid numbers even where the polyester has a low hydroxyl number, i.e., less than 60 although our process is useful with polyesters having hydroxyl numbers up to about 600. In fact, we have been able to prepare polyesters of these low acid numbers where, by conventional esterification procedures, such polyesters have been heretofore very difficult to achieve. Our discovery makes use of novel and unique tin(ous) esterification catalysts which may be described by the following formula:

$$Sn(OOCR)_2$$

wherein R is a saturated or unsaturated straight or branched chain aliphatic substituent having from about 7 to 17 carbon atoms in its chain. Examples of tin catalysts coming within our novel class of catalysts are:

Tin(ous) 2-ethylhexoate
Tin(ous) n-octoate
Tin(ous) laurate
Tin(ous) palmitate
Tin(ous) stearate
Tin(ous) oleate

Also, we have discovered that stannous oxide may be successfully used to achieve the objects of our invention. However, we have found that there is an induction period before this catalyst takes effect whereas our other catalysts do not exhibit this induction period.

Our invention is applicable to the preparation of many polyesters by the direct esterification of polycarboxylic acids or their anhydrides with polyhydric alcohols where acid values less than 5 and especially less than 1 are desired. Useful polycarboxylic acids or anhydrides are adipic acid, sebacic acid, isosebacic acid, azalic acid, citric acid, tartaric acid, trimellitic acid, phthalic acid, terephthalic acid, phthalic anhydride, maleic acid, maleic anhydride or mixtures thereof. Useful polyhydric alcohols are ethylene glycol, diethylene glycol, 1,2-propylene glycol, 1,4-butylene glycol, 1,6-hexane diol, glycerol, trimethylol propane, pentaerythritol, mannitol, etc. and their mixtures. Our process also is applicable to the preparation of modified polyesters which are produced by adding materials such as oleic acid, castor oil, linseed oil, resin copal, rosin etc., to the polyhydric alcohol-polycarboxylic acid mixture prior to esterification. The polyesters which may be prepared according to our process have many uses. For instance, they may be reacted with an organic polyisocyanate in the presence of a catalyst in order to prepare foamed polyurethane resins. The resulting foamed material suffers no deleterious effects due to the presence of the stannous catalysts in the polyester during the foaming procedure. These polyesters may also be used as molding and laminating resins. It is to be understood that the selection of the particular polyhydric alcohols and polycarboxylic acids or anhydrides, or for that matter, the proportions of these materials which are to be esterified is not a critical feature of our invention. The selection of these materials and their proportions in esterification reactions is well known and within the skill of the art and moreover is to a great extent influenced by the ultimate use of the polyester. Moreover, our invention is not limited solely to the preparation of very low acid number polyesters. It may be practiced wherever it is desired to enhance the rate of esterification.

When carrying out our process, our tin catalysts are generally present in an amount of from about 0.0005 to 0.01 mol of catalyst per 1,000 grams of polyester. Both larger and smaller quantities of catalyst can be used in carrying out the esterification. However, the presence of larger quantities may result in an unwanted impurity depending upon the ultimate use of the polyester. Although the catalyst may be initially introduced with the materials to be esterified, we prefer to introduce the catalyst at a time when the esterification reaction slows down. For example, in many cases the catalyst is introduced when an acid value of about 20 to 30 is reached. Esterification is preferably carried out in the presence of an inert atmosphere such as nitrogen. Because of the nature of our catalysts, temperatures above about 220° C. are unnecessary and in fact may even cause degradation of the catalyst and the polyester. The minimum esterification temperature is not critical. It must be high enough, so that the water of esterification can be readily removed, thereby enabling the reaction to proceed in the proper direction, viz., ester formation. The water can be readily removed by atmospheric, subatmospheric or azeotropic distillation, etc. Under present practice, 190° C. is a preferred minimum temperature when the esterification, along with water removal, is carried out under atmospheric pressure. However, higher temperatures, e.g., as high as 240° C., may be used during the esterification reaction prior to the introduction of the catalyst. The time of reaction, of course, depends upon the temperatures used.

The following examples further illustrate our invention, however, they are not to be construed in a limiting manner since other embodiments and variations within the scope of our invention will become apparent to those skilled in the art.

The general procedure used in the esterification process described in the following examples is as follows. The starting materials, i.e., the polycarboxylic acid, polyhydric alcohol as well as modifiers, if present, were charged into a resin reaction flask equipped with a condenser, water trap, agitator, thermometer and nitrogen sparge tube. Thereafter, the reaction flask was heated to temperatures of between about 150° to 200° C. at which time from about 80% to 90% of the theoretical quantity of the water of esterification had been taken off. The temperature was then slowly brought up to 230° C. and maintained until an acid value of 20 was reached. At this time, the temperature was lowered to 200° C. and the catalyst introduced into the reaction flask. When the catalyst was stannous 2-ethylhexoate or stannous oleate, it was introduced into the reaction flask as a concentrated solution of the catalyst and a small portion of the batch sample. When the catalyst was stannous oxide, antimony oxide or zinc 2-ethylhexoate, it was introduced in the form of a concentrated slurry of catalyst and batch sample. Heating at 200° C. was then continued until the desired acid value and viscosity was reached.

In Examples I through VII the starting materials for the polyester were instance where a low acid value was reached with antimony oxide, an exceedingly long reaction time, viz., 12 hours, was needed. When a short reaction time was used with zinc 2-ethylhexoate, a low acid value was not reached. On the other hand, the use of the catalysts of the present invention enabled a low acid value polyester to be prepared in a short period of time.

In the following two examples, the starting materials for the polyester were

|  | Parts by weight |
|---|---|
| Diethylene glycol | 41.87 |
| Adipic acid | 54.98 |
| Trimethylolpropane | 3.15 |

| Ex. | Catalyst | Conc. of Catalyst (mols per 1,000 gms. of polyester) | Nitrogen flow (liters per min.)[1] | Acid value reached | Time to reach acid value (hrs.) | Final Physical Constants | | |
|---|---|---|---|---|---|---|---|---|
|  |  |  |  |  |  | Hydroxyl No. | Acid value | Visc. at 25° C.(cps.) |
| VIII | Stannous 2-ethylhexoate | 0.0018 | 3 | 1.2 | 7.75 | 64 | 1.2 | 18,000 |
| IX |  |  | 3 | 6.2 | 14.75 | 65 | 6.2 | 19,000 |

[1] Nitrogen flow raised to this rate after an acid value of 30 was reached.

In the two preceding examples, it can be seen that even a doubling of the reaction time still does not bring about the formation of a low acid value polyester in the absence of the catalyst.

It must be appreciated that comparisons of different catalysts or of a catalyst and a control must be made using the same polyester composition under the same reaction conditions. However, as Examples VIII and IX show, when no catalyst is used, heating for twice as long a period of time still cannot bring down the acid value under the same reaction conditions.

|  | Parts by weight |
|---|---|
| Diethylene glycol | 43.80 |
| Adipic acid | 55.31 |
| Trimethylolpropane | 0.89 |

| Ex. | Catalyst | Conc. of catalyst (mols per 1,000 gms. of polyester) | Nitrogen flow (liters per min.) | Acid value reached | Time to reach preceding acid value from an acid value of 20 (hrs.) | Final Physical Constants | | |
|---|---|---|---|---|---|---|---|---|
|  |  |  |  |  |  | Hydroxyl No. | Acid value | Visc. at 30° C. (cps.) |
| I | Stannous 2-ethylhexoate | 0.0018 | 1.5 | 2.0 | 3.5 | 61.0 | 0.75 | 5,300 |
| II | Stannous oxide | 0.0018 | 1.5 | 2.2 | 5.0 | 60.0 | 2.2 | 8,000 |
| III | Zinc 2-ethylhexoate | 0.0018 | 1.5 | 9.0 | 3.5 | 69.5 | 9.0 | 3,400 |
| IV | Antimony oxide | 0.0018 | 1.5 | 3.5 | 12.0 | 61.0 | 3.5 | 6,600 |
| V | Stannous oleate | 0.0009 | 3.0 | 2.2 | 4.0 | 61.2 | 2.2 | 6,000 |
| VI | Stannous oleate | 0.0054 | 3.0 | 2.0 | 2.0 | 60.0 | 2.0 | 6,000 |
| VII | Stannous 2-ethylhexoate | 0.0036 | 3.0 | 3.0 | 1.7 |  |  |  |

A comparison of Examples I and II with III and IV indicates that under identical reaction conditions antimony oxide and zinc 2-ethylhexoate are not as effective as the catalysts of the present invention in bringing about low acid number polyesters in short periods of time. In one The following two examples are directed to the preparation of a polyester resin having a relatively high hydroxyl number which is used in the preparation of rigid foamed polyurethanes. The starting materials for the polyester were

|  | Mol ratio (mols) |
|---|---|
| Phthalic anyhdride | 7.15 |
| Adipic acid | 35.66 |
| Trimethylolpropane | 57.19 |

| Ex. | Catalyst | Conc. of catalyst (mols per 1,000 gms. of polyester) | Nitrogen flow (liters per min.) | Acid value reached | Time to reach preceding acid value from an acid value of 20 (hrs.) | Final Physical Constants | | |
|---|---|---|---|---|---|---|---|---|
|  |  |  |  |  |  | Hydroxyl No. | Acid value | Visc. at 25° C. (cps.) |
| X | Stannous 2-ethylhexoate | 0.0018 | 3 | 0.8 | 3.0 | 371 | 0.8 | 1,400,000 |
| XI |  |  | 3 | 1.4 | 6.5 | 373 | 1.4 | 1,450,000 |

In order to demonstrate that polyester resins prepared with the catalysts disclosed herein can be successfully used in the preparation of foamed urethane resins without any deleterious effects, the following was carried out.

*Example XII*

Three different polyester resins were prepared. One polyester resin corresponded to Example I in which stannous 2-ethylhexoate was used in an amount of 0.0018 mol per 1000 grams of polyester. A second polyester resin which corresponded to Example VI was prepared in which stannous oleate was present in an amount of 0.0054 mol per 1000 grams of polyester. A third polyester resin which was the control was prepared in which no catalyst was used. The starting materials for the polyester were

| | Parts by weight |
|---|---|
| Diethylene glycol | 43.80 |
| Adipic acid | 51.31 |
| Trimethylolpropane | 0.89 |

The above three polyesters were foamed in the following manner. 100 gram portions of each of the three polyester resins were placed in a vessel after which the following water catalyst mixture was added to each resin:

| | Grams |
|---|---|
| N-laurylmorpholine | 2.2 |
| N-ethylmorpholine | 1.8 |
| Emulsifiers | 2.0 |
| Water | 3.6 |

Finally, 48.0 grams of toluene diisocyanate (80% by weight 2,4 isomer and 20% by weight 2,6 isomer) were introduced into each polyester catalyst mixture. After blending the resulting mixture, the material was poured into an open container and allowed to free rise. Upon a visual examination, all three samples looked alike.

The resulting foamed products prepared from each of the three polyester resins were cut up into small squares approximately 2″ x 2″ x 1″ in size and tested for dry heat deterioration. This test comprised introducing the samples into an oven maintained at a temperature of 250° F. for periods of 12 and 24 hours. The samples of foamed resin were removed after the specified periods of time and the compression-load-deflection of each sample determined. No deterioration was observed in the samples. Another test, viz., a humidity aging test, was run on samples of the three foamed products prepared above. The samples were heated at 220° C. for 3 hours at 100% relative humidity. The compression-load-deflection of each sample was then determined. No significant differences were observed among the samples. Hence, the presence of the tin catalyst did not contribute to heat or humidity deterioration of the foamed resins prepared from polyesters containing same.

Having described our invention, what we claim as new and desire to secure by Letters Patent is:

1. A process for preparing polyesters having acid numbers less than about 5 in relatively short periods of time, said polyesters being free from discoloration, comprising the steps of directly esterifying at least one organic aliphatic hydrocarbon polyhydric alcohol with at least one member of the group consisting of organic hydrocarbon polycarboxylic acids and anhydrides thereof at a temperature below about 220° C. in the presence of catalytic amounts of stannous compounds having the structure $$Sn(OOCR)_2$$

wherein R is selected from the group consisting of saturated and unsaturated aliphatic hydrocarbon substituents having from about 7 to about 17 carbon atoms.

2. The process of claim 1 in which said catalyst is present in an amount of from about 0.0005 to 0.01 mol per 1000 grams of polyester.

3. The process of claim 2 in which said esterification is carried out at a temperature of from about 190° C. to about 220° C.

4. The process of claim 3 in which said esterification is carried out under an inert atmosphere.

5. The process of claim 3 in which said catalyst is stannous n-octoate.

6. The process of claim 3 in which said catalyst is stannous 2-ethylhexoate.

7. The process of claim 6 in which said catalyst is present in an amount of from about 0.0018 to about 0.0036 mol per 1000 grams of polyester.

8. The process of claim 3 in which said catalyst is stannous oleate.

9. The process of claim 8 in which said catalyst is present in an amount of about 0.0054 mol per 1000 grams of polyester.

10. A process for preparing polyesters having acid numbers less than about 5 in relatively short periods of time, said polyesters being free from discoloration, comprising the steps of directly esterifying at least one organic aliphatic hydrocarbon polyhydric alcohol with at least one member of the group consisting of organic hydrocarbon polycarboxylic acids and anhydrides thereof at a temperature below about 220° C. in the absence of a catalyst until an acid value of approximately 30 is reached and thereafter introducing catalytic amounts of stannous compounds having the structure $$Sn(OOCR)_2$$

wherein R is selected from the group consisting of saturated and unsaturated aliphatic hydrocarbon substituents having from about 7 to about 17 carbon atoms.

References Cited in the file of this patent

UNITED STATES PATENTS

| 2,257,384 | Johnston | Sept. 30, 1941 |
| 2,578,660 | Auspos | Dec. 18, 1951 |
| 2,720,507 | Caldwell | Oct. 11, 1955 |
| 2,892,815 | Hobson | June 30, 1959 |
| 3,057,824 | Le Bras | Oct. 9, 1962 |

FOREIGN PATENTS

| 1,005,947 | Germany | Apr. 1957 |